United States Patent
Donnellan et al.

(10) Patent No.: US 10,187,868 B2
(45) Date of Patent: Jan. 22, 2019

(54) SYSTEMS AND METHODS FOR FINDING A USER DEVICE BASED ON SENSOR READINGS OF THE USER DEVICE

(71) Applicant: Verizon Patent and Licensing Inc., Arlington, VA (US)

(72) Inventors: Kevin Donnellan, North Brunswick, NJ (US); Manoj Monga, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/483,778

(22) Filed: Apr. 10, 2017

(65) Prior Publication Data

US 2018/0295598 A1  Oct. 11, 2018

(51) Int. Cl.
H04W 64/00  (2009.01)
H04W 4/02  (2018.01)

(52) U.S. Cl.
CPC ................... *H04W 64/00* (2013.01)

(58) Field of Classification Search
CPC ....... H04W 64/00; H04W 8/22; H04W 4/025; H04W 4/02; H04W 12/12; H04W 4/029; H04W 4/043; H04W 24/00; H04W 48/12; H04W 4/00; H04W 4/021; H04W 4/50; H04W 4/70; H04W 4/80; H04W 84/12; H04W 84/18; H04W 8/24
USPC ...................... 45/456.1–456.6; 455/411, 420
See application file for complete search history.

(56) References Cited

U.S. PATENT DOCUMENTS

| | | | | |
|---|---|---|---|---|
| 2005/0024201 A1* | 2/2005 | Culpepper | ............ | G01S 5/0263 340/539.13 |
| 2006/0187028 A1* | 8/2006 | Kiang | .................. | G01C 21/165 340/539.13 |
| 2006/0232472 A1* | 10/2006 | Roslak | .................. | G01S 5/0252 342/457 |
| 2006/0244830 A1* | 11/2006 | Davenport | ............ | B61L 25/021 348/148 |
| 2006/0287813 A1* | 12/2006 | Quigley | .................... | G01S 5/02 701/533 |
| 2008/0055158 A1* | 3/2008 | Smith | ..................... | G01S 5/021 342/464 |
| 2009/0075675 A1* | 3/2009 | Kim | ..................... | H04W 64/00 455/456.2 |
| 2010/0120449 A1* | 5/2010 | Jakorinne | ............. | G01S 5/0018 455/456.1 |
| 2010/0161658 A1* | 6/2010 | Hamynen | ........... | G06F 17/3087 707/770 |
| 2010/0273452 A1* | 10/2010 | Rajann | .................... | H04W 8/22 455/411 |

(Continued)

*Primary Examiner* — Nathan Taylor

(57) ABSTRACT

Techniques described herein may be used to locate a user device within a wireless network. A first user device may send, to a location server, a request to locate a second user device. The location server may determine a general location of the second user device based on a wireless network service, a Global Positioning System (GPS) service, etc. The location server may collect sensor information (e.g., Radio Frequency (RF) signal strength, temperature, pressure, etc.) from the first user device and/or the second user device. The location server may analyze, compare, and otherwise process the sensor information to generate and send, to the first user device, instructions for locating the second user device.

15 Claims, 16 Drawing Sheets

(56) References Cited

U.S. PATENT DOCUMENTS

| | | | | |
|---|---|---|---|---|
| 2011/0199259 A1* | 8/2011 | Karaoguz | ............... | G01S 19/48 342/357.28 |
| 2011/0228727 A1* | 9/2011 | Julo | ............ | G01S 19/16 370/328 |
| 2012/0083286 A1* | 4/2012 | Kim | .............. | G06Q 30/0261 455/456.1 |
| 2012/0235812 A1* | 9/2012 | Maia | ............ | G01S 13/08 340/539.13 |
| 2013/0079039 A1* | 3/2013 | Heikkilae | ............ | H04W 4/025 455/456.6 |
| 2013/0253818 A1* | 9/2013 | Sanders | ............ | G01C 21/206 701/419 |
| 2013/0326643 A1* | 12/2013 | Pai | ............ | G06F 21/88 726/35 |
| 2014/0084050 A1* | 3/2014 | Calvarese | ............ | G01C 21/206 235/375 |
| 2014/0223467 A1* | 8/2014 | Hayton | ............ | G06Q 30/0631 725/18 |
| 2015/0163461 A1* | 6/2015 | Eustice | ............ | H04W 4/00 348/77 |
| 2015/0310310 A1* | 10/2015 | Hesch | ............ | G06K 9/6232 382/103 |
| 2016/0178379 A1* | 6/2016 | Moraru | ............ | G01C 21/206 701/522 |
| 2016/0350906 A1* | 12/2016 | Meier | ............ | G06T 17/10 |

* cited by examiner

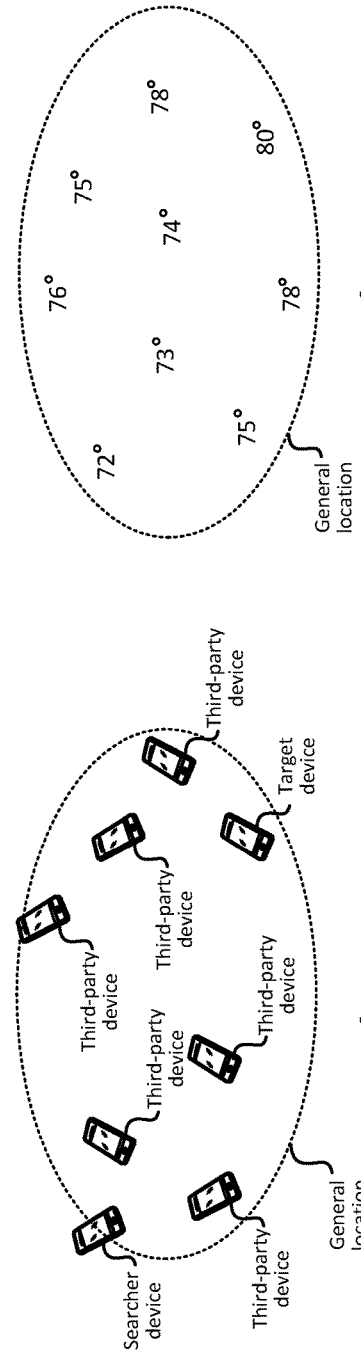
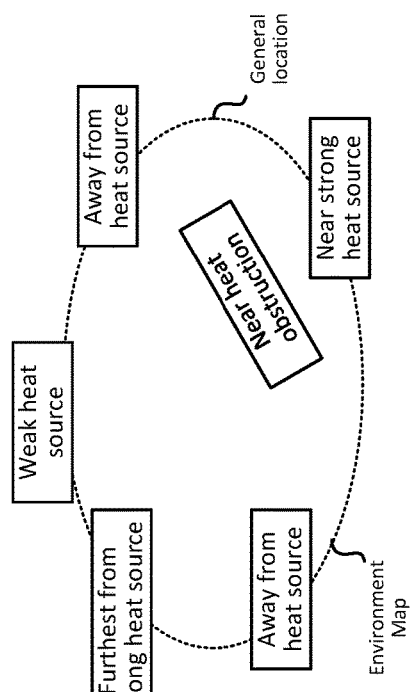

| Search Algorithm Types | | |
|---|---|---|
| Environment Matching Algorithms | Gradient Matching Algorithms | Echo Matching Algorithms |
| Possible types of sensor information: Temperature; Pressure; Sound. | Possible types of sensor information: RF signal; Luminescence; Ambient sound; Temperature. | Possible types of sensor information: Temperature; Pressure; Ambient sound. |
| Compare combinations of sensor patterns, determine similarities and differences, provide feedback to user | Compare individual sensor readings, determine differences, provide constant feedback to user | Cause target device to operate as beacon, monitor changes in beacon signal, provide feedback to user regarding changes |

Fig. 12

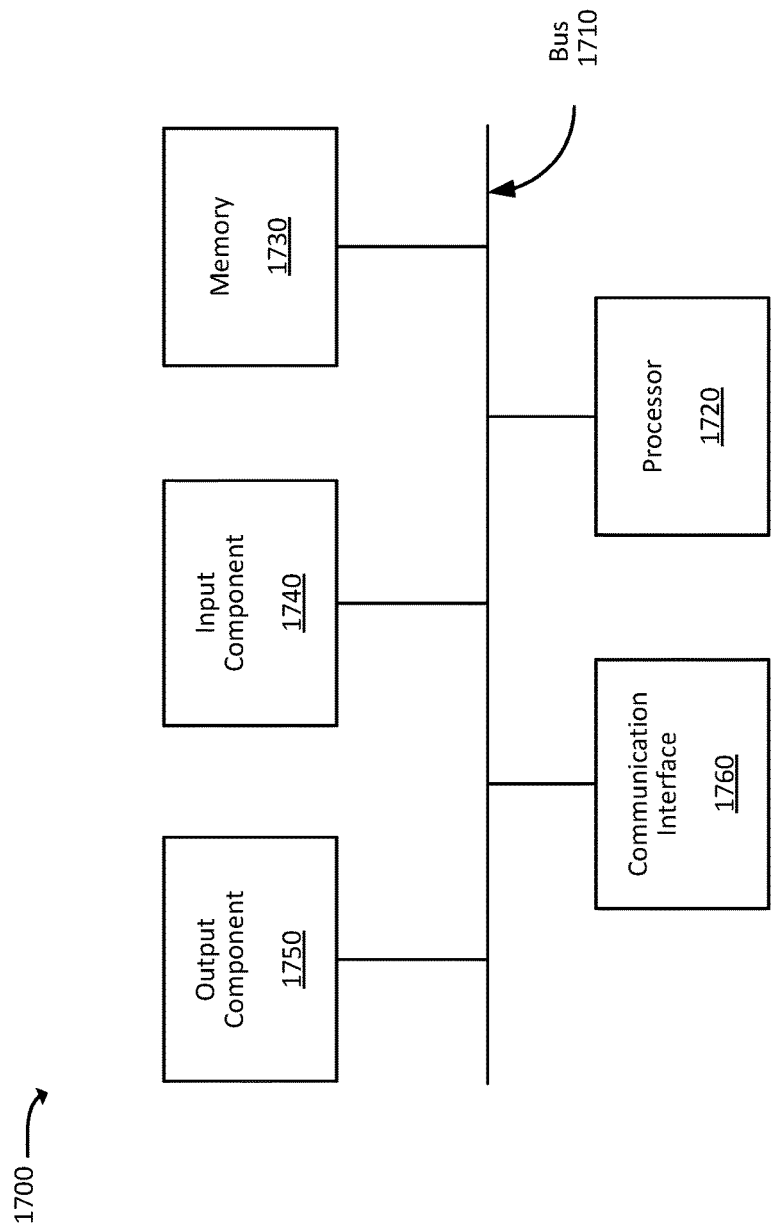

| Temperature Pattern | RF Signal Pattern | Luminescence Pattern | Pressure Pattern | Ambient Sound Pattern |
|---|---|---|---|---|
| TP1 (Indoors - Consistent, room temperature) | RFP1 (Blocked - low signal strength but near AP) | LP1 (In Office - consistently bright) | PP1 (On a particular floor of a building - according to elevation change) | SP1 (Near a loud sound source - loud high pitch) |
| TP2 (Outdoors - very high, very low, or changes according to daytime) | RFP2 (Far from AP - low signal strength consistent) | LP2 (Outdoors - bright during day hours, changes according to sunrise and sunset) | PP2 (Underground - consistently below atmospheric pressure) | SP2 (Near a car or motor - high pitch humming) |
| TP3 (Near heat source - consistently high) | RFP3 (Near AP - high signal strength consistent) | LP3 (In an Enclosure - consistently dark) | PP3 (At high altitude - consistently very low) | SP3 (In a crowd - high background noise in the audible range) |
| TP4 (Moving - changes according to being indoor and outdoor) | RFP4 (Moving - slow and/or periodic changes in signal strength) | LP4 (Passing streetlights or near an alarm - flashing) | PP4 (At low altitude - consistently very high) | SP4 (On a city street - high background white noise) |
| TP5 (Melting (or freezing) - consistently at or near a melting (or freezing) point) | RFP5 (Between APs - signal strength changing rapidly) | LP5 (Facing light source - consistently bright) | PP5 (Vertical velocity - smooth change) | SP5 (In an enclosed space - echo) |

Fig. 18

SYSTEMS AND METHODS FOR FINDING A USER DEVICE BASED ON SENSOR READINGS OF THE USER DEVICE

BACKGROUND

Wireless networks often include wireless access points (e.g., wireless routers, base stations, etc.) that enable user devices (e.g., smartphones, laptops, tablet computers, etc.) to connect to the network. A benefit of such networks is that user devices may remain connected to the network while users move throughout the network.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIGS. 8-10 are diagrams of an example for finding a target device based on one or more of the techniques described herein;

FIG. 12 is a diagram of an example of types of search algorithms;

FIG. 17 is a block diagram of example components of a device; and

FIG. 18 is an example of a combination of sensor patterns that describes a possible location of a target device.

DETAILED DESCRIPTION OF PREFERRED EMBODIMENTS

Figure 1:
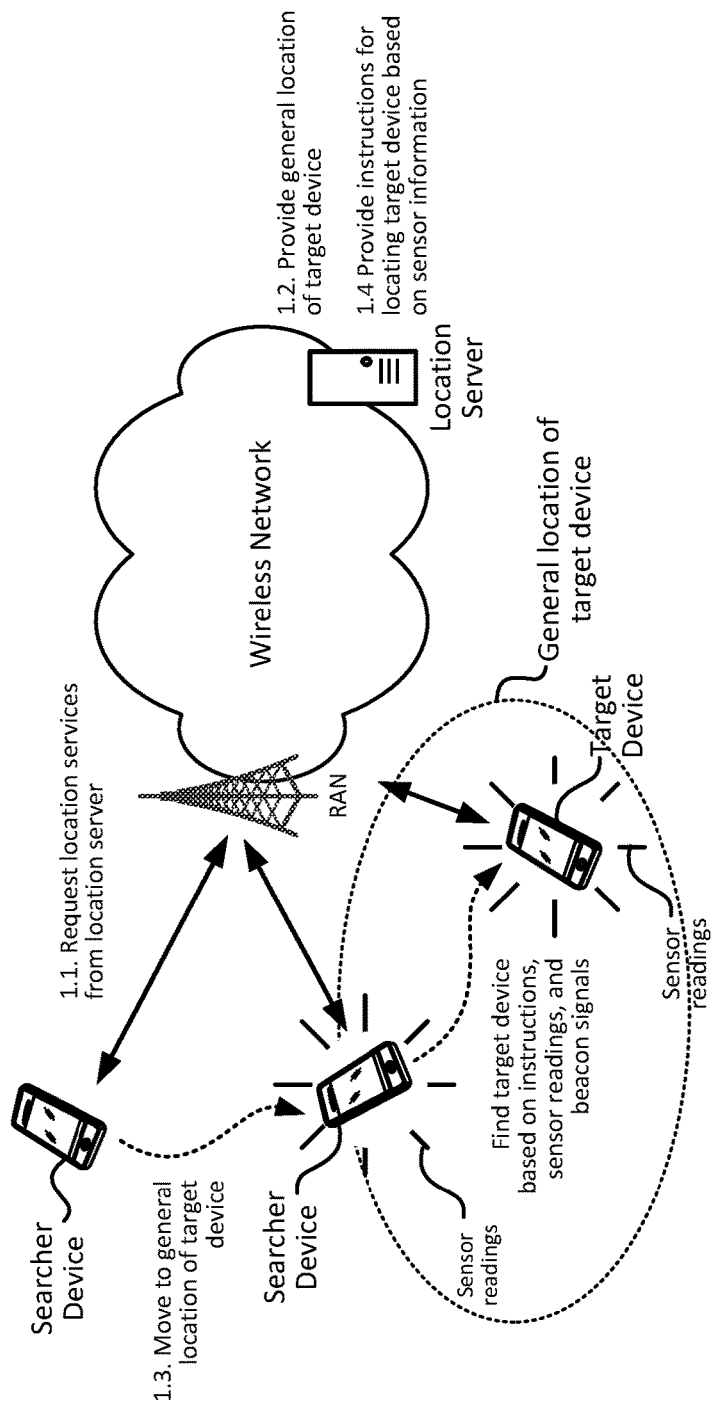
FIG. 1 illustrates an example overview of an embodiment described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

The techniques described herein may be used to find a target user device (referred to herein as a target device) in a wireless telecommunication network. A user may operate a searching user device (referred to herein as a searcher device) to send, to a location server, a request to locate a target device. The location server may provide the searcher device with a general location of the target device based on a wireless network location service, a Global Positioning System (GPS) service, etc. The location server may also cause the target device and/or the searcher device to collect sensor readings (Radio Frequency (RF) signal strength, temperature, luminescence, pressure, etc.) using sensors of the target device and the searcher device (e.g., an antenna, thermometer, camera, pressure sensor, etc.). The sensor readings may be used to define a more precise location or environment of the target device within the general location, and to provide the user of the searcher device with instructions on how to find the target device.

As such, the device location techniques, described herein, may assist a user to locate a lost, stolen, or otherwise unlocatable user device, by providing additional information about the exact environment in which the user device is located, whether it be in a filing cabinet, near a heating vent, next to a window, inside, outside, etc. The additional information may be based on prolonged sensor patterns (e.g., lighting patterns indicative of the user device being indoors or outdoors), individual sensor readings (e.g., audible readings indicative of the user device being in a quiet, loud, or moderately quiet/loud environment), and/or real-time information (e.g., real-time feedback based on whether the search device is getting closer to the environment of the target device). As such, the techniques described herein may provide, dynamic, in-depth, real-time, and customized information about how to find a lost or stolen user device.

Certain embodiments, described herein, may include a user operating a mobile searcher device (e.g., a smartphone) to initiate, participate in, and otherwise benefit from the device location techniques described herein. In some embodiments, the device location techniques, described herein, may be implemented in other ways. For example, in some embodiments, a user may operate a non-mobile user device (e.g., a desktop computer) to access, initiate, and/or benefit from the device location techniques described herein. For example, a user may operate a desktop computer to open a web browser and access a webpage that enables users to request (and receive) device location services for another device. In such embodiments, information and instructions may be provided to the user via the webpage (or a related webpage), an email address, or another type of messaging service suitable for assisting a user to locate a lost or stolen device. In a similar manner, the user could go to an office or storefront of a network service provider and have a store clerk, technician, or another individual initiate and help provide the device location services discussed herein.

FIG. 1 illustrates an example overview of an embodiment described herein. As shown, a searcher device may send a request, to a location server, for a location service regarding a target device (at 1.1). In response, the location server may determine a general location of the target device based on a wireless network location service, a GPS service, etc. The general location may include a geographic area where the target device is estimated to be (as opposed to, for example, the exact location of the target device). The location server may send the general location to the searcher device (1.2), which may enable the user of the searcher device to move to the general location (at 1.3).

The location server may cause the searcher device and/or the target device to collect sensor information. The searcher device and/or the target device may collect certain types of sensor information (e.g., Radio Frequency (RF) signal strength, temperature, pressure, luminescence, ambient sound, etc.) and send the sensor information to the location server. The location server may analyze the sensor information from searcher device and/or the target device and may provide the searcher device with instructions about how to find the target device within the general location (at 1.4). For example, if the temperature readings from each device are different, instructions may be provided to the user of the searcher device to move to a different location (a warmer or cooler location) within the general area. As another example, if pressure readings of the devices are different (e.g., suggesting that the devices are on different floors of a building), instructions may be provided to the user of the searcher device to move to a floor of the building that corresponds to the pressure reading of the target device.

Distinct types and/or combinations of sensor readings (also referred to herein as sensor information) may be used to help the user of the searcher device locate the target device. For example, sensor readings describing a general environment of the searcher device and the target device (e.g., temperature, pressure, and audible sound) may be used initially. Once the searcher device moves to the same environment of the target device, sensor readings such as RF signal strength and luminescence, may be used to provide constant feedback (based on changes in the sensor readings) about whether the searcher device is getting closer or further from the target device. Additionally, when the searcher device comes within close proximity to the target device, the searcher device may attempt to communicate directly with the target device (also referred to herein as point-to-point communication). For example, the searcher device may broadcast a request for the target device to operate as a location beacon (e.g., by periodically generating a sound that the user may hear, by sending a short-range wireless signal to the searcher device, etc.).

Figure 2:
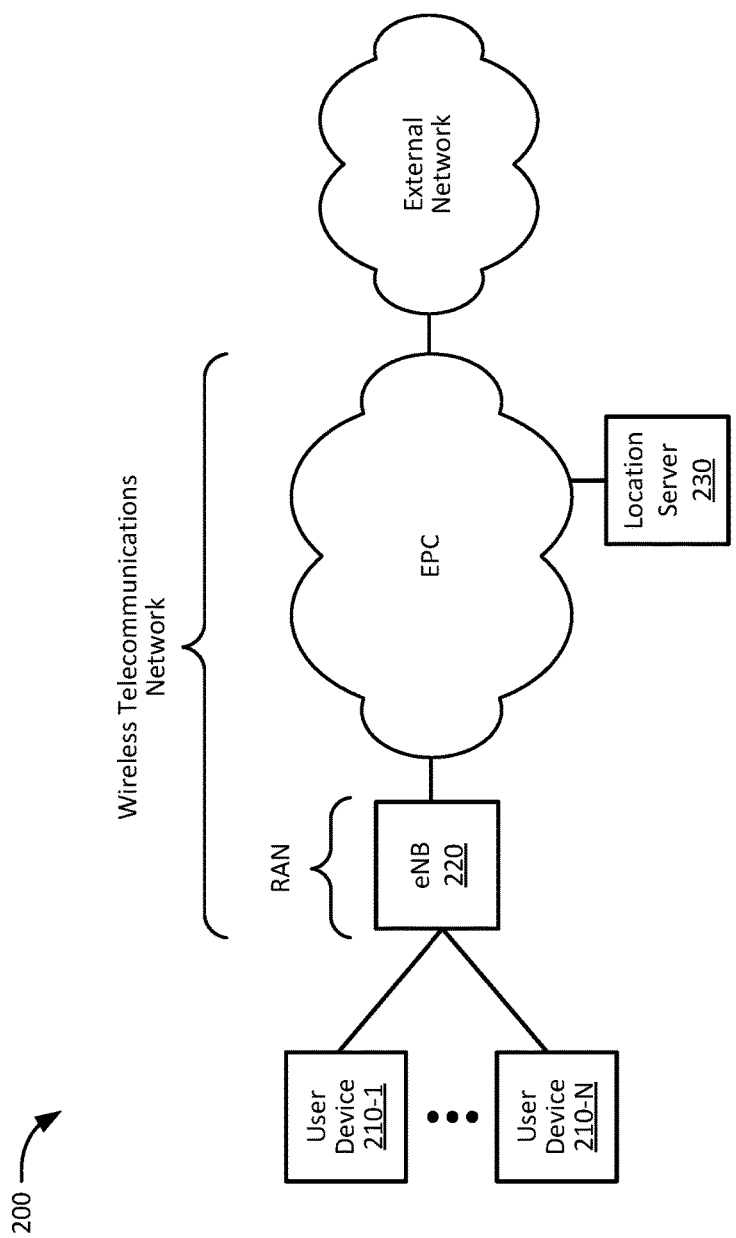
FIG. 2 is a diagram of an example environment in which systems and/or methods described herein may be implemented.

FIG. 2 illustrates an example environment 200 in which systems and/or methods described herein may be implemented. Environment 200 may include user device 210 (which may be referred to herein individually as "user device 210" or collectively as "user devices 210"), a wireless telecommunication network, and an external network. The wireless telecommunication network may include an Evolved Packet System (EPS) that includes a Long-Term Evolution (LTE) network and/or an evolved packet core (EPC) network that operates based on a 3rd Generation Partnership Project (3GPP) Wireless Communication Standard.

The LTE network may be, or may include, radio access networks (RANs) that include one or more base stations, some or all of which may take the form of enhanced Node Bs (eNBs) 220, via which user devices 210 may communicate with the EPC network. As shown, the EPC network may enable user devices 210 to communicate with an external network, such as a Public Land Mobile Networks (PLMN), a Public Switched Telephone Network (PSTN), an Internet Protocol (IP) network (e.g., the Internet), and/or a Global Positioning System (GPS) network. The wireless telecommunication network may also include location server 230 that may be part of, or otherwise connected to, the EPC.

User device 210 may include a portable computing and communication device, such as a personal digital assistant (PDA), a smart phone, a cellular phone, a laptop computer with connectivity to the wireless telecommunications network, a tablet computer, etc. User device 210 may also include a non-portable computing device, such as a desktop computer, a consumer or business appliance, or another device that can connect to a RAN of the wireless telecommunications network. User device 210 may also include a computing and communication device that may be worn by a user (also referred to as a wearable device) such as a watch, a fitness band, a necklace, glasses, an eyeglass, a ring, a belt, a headset, or another type of wearable device.

User device 210 may include one or more sensors that can sense a particular type of information. For example, user device 210 may include a proximity sensor, a light sensor, a barometric pressure sensor, a magnetometer, an accelerometer, a gyroscope, and a thermometer (e.g., a battery thermometer, ambient temperature sensor, etc.). As described herein, information collected by the sensors of user devices 210 may be used to locate a lost or stolen user device 210 (referred to herein as a target device) and to provide instructions to another user device 210 (referred to herein as a searcher device) about how to find the lost or stolen user device. A searcher device and/or a target device, as described herein, may include any type of user device, end device, Internet of Things (IoT) device, or another type of device with sensors and/or an ability to provide instructions to a user.

eNB 220 may include one or more network devices that receives, processes, and/or transmits traffic destined for and/or received from user device 210 (e.g., via an air interface). eNB 220 may be connected to a network device, such as site router, that functions as an intermediary for information communicated between eNB 220 and the EPC.

Location server 230 may include one or more server devices that receive, process, and send information to assist a searcher device to locate a target device. For example, location server 230 may receive a request to help one user device 210 (a searcher device) locate another user device 210 (a target device) that may have been lost or stolen. In response, location server 230 may determine the general location of the target device, receive sensor information from user devices 210 within the general location, determine sensor patterns based on the sensor information, apply the sensor patterns to the general location to ascertain the precise location of the target device, and provide, to the searcher device, more detailed information about the location of the target device.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environment 200. Additionally, the devices of environment 200 may interconnect with each other and/or other devices via wired connections, wireless connections, or a combination of wired and wireless connections. In some embodiments, one or more devices of environment 200 may be physically integrated in, and/or may be physically attached to, one or more other devices of environment 200. Also, while "direct" connections may be shown between certain devices in FIG. 2, some of said devices may, in practice, communicate with each other via one or more additional devices and/or networks.

In addition, one or more of the devices illustrated in FIG. 2 (and/or one or more of the functions thereof) may be implemented as a virtual device or a virtual network function (VNF) that are deployed as part of a software defined network (SDN) implemented in a cloud computing environment consisting of multiple server devices capable of sharing resources (e.g., processing capacity, memory capacity, storage capacity, network capacity, etc.). Additionally, while one or more of the devices of FIG. 2 may correspond to a 4th Generation (4G) network, the techniques described herein may also, or alternatively, be implemented in a 5th Generation (5G), or other advanced network.

Figure 3:
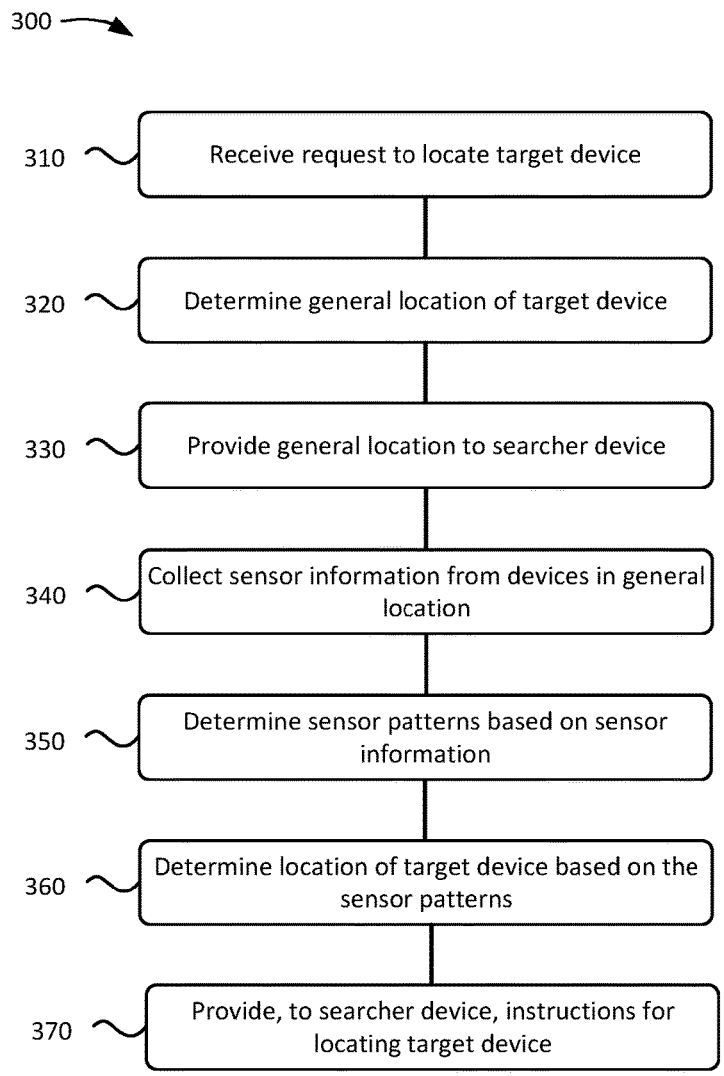
FIG. 3 is a diagram of an example process for locating a target device within a wireless network.

FIG. 3 is a diagram of an example process 300 for locating a target device within a wireless network. Process 300 may be performed by location server 230. In some embodiments, one or more of the operations of process 300 may be performed by one or more additional, or alternative, devices, such as a searcher device and/or a target device. A description of FIG. 3 is provided below, with periodic references to FIGS. 4-6.

As shown, process 300 may include receiving a request to locate a target device (block 310). For example, location server 230 may receive a message that includes a request to help locate a target device. The request may include information uniquely identifying the target device, such as a standard telephone number, a Mobile Subscriber Number (MDN), International Mobile Subscriber Identity (IMSI), International Mobile Equipment Identity (IMEI), etc. The request may also include an indication of one or more capabilities of the searcher device, such as sensors of the searcher device, whether the searcher device may engage in device-to-device (D2D) communications, etc. In some embodiments, the request may also include authentication and/or authorization information that may be used, by location server 230, to determine/verify whether the user of the searcher device is permitted to access the location services of location server 230 and/or use the location services to locate the target device.

Process 300 may also include determining a general location of the target device (block 320). For example, location server 230 may determine a geographic area where the target device appears to be located. The general location may include a two-dimensional area of a map. For example, if the actual location of the target device is somewhere in a ten-story building, the general location may include an address of the building, a geographic area that includes the building, etc., without indicating (for example) which floor of the building the target device is on. In some embodiments, the general location may include a three-dimensional area. For example, the target user device may be connected to (or otherwise in the coverage area) of a wireless access point (e.g., a wireless router) with a known, three-dimensional location, such as the third floor of a particular building.

Location server 230 may determine the general location using a device location service of the wireless network to which the target device to connected. For example, location server 230 may determine the general location based on a coverage area of the eNB 220 (e.g., the Cell ID, Enhanced Cell ID, etc.) to which the target device is connected. In some embodiments, location server 230 may reduce the size of the general location to an area of overlapping coverage areas by determining whether the target device is also in rage of other eNBs 220. Additionally, or alternatively, a device location technique, such as the Observed Time Difference of Arrival technique, may be used to determine the general location of the target device.

Figure 4:
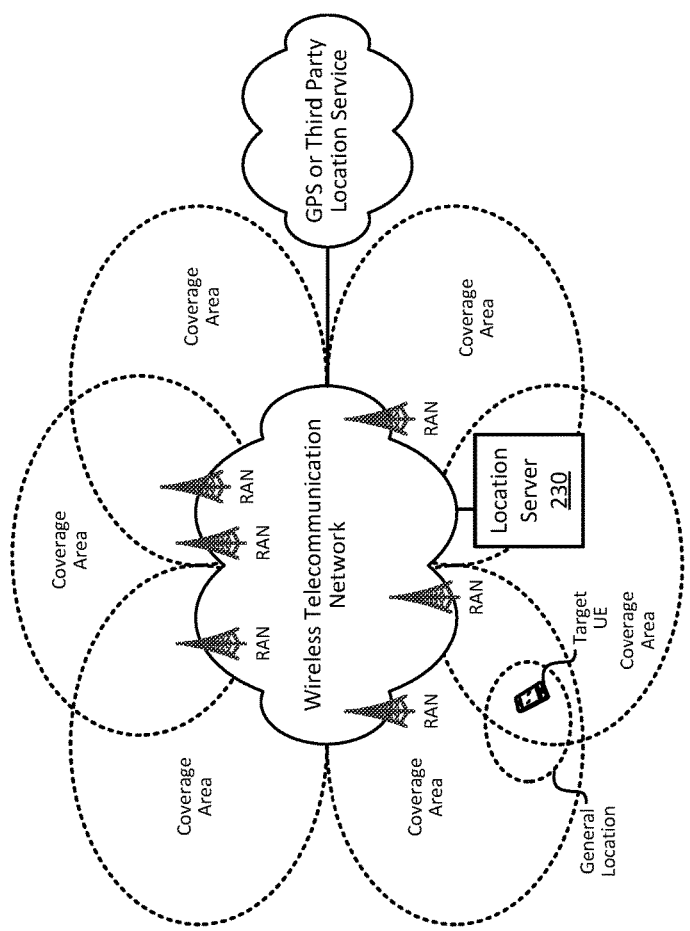
FIG. 4 is a diagram of an example of a general location of a target device.

FIG. 4 is a diagram of an example of a general location of a target device. As shown, a wireless telecommunication network may include one or more coverage areas, which may correspond to a RAN (e.g., eNB 220) of the network.

Location sever 230 may determine the general location of the target device based on the RAN to which the target device is connected, in which case the general location may be an entire coverage area. As mentioned above, location sever 230 may use one or more techniques such as determining whether the target device is also within range of one or more other RANs, a distance measuring technique (such as an Observed Time Difference of Arrival), triangulation, etc., to reduce the general location to smaller area.

Additionally, or alternatively, location server 230 may determine the general location based on a device location service outside the wireless telecommunication network. For example, location server 230 may activate a GPS chipset of the target device and determine the general location based on location information received from a GPS service. In another example, location server 230 may activate device location software (e.g., a mobile application) installed on the target device, and determine the general location based on location information received via the device location software. Examples of device location software may include the Find My iPhone® service by Apple, Inc.®, the Android Device Manager® by Google, Inc.®, etc.

Process 300 may also include providing the general location to the searcher device (block 330). For instance, location server 230 may communicate the general location, of the target device, to the searcher device. In some embodiments, the searcher device may provide the general location to the user of the searcher device. For instance, the searcher device may display a map that includes a graphical indication of the general location (e.g., a circle defining an area on the map). The map may also include a representation of the current location of the searcher device and/or a suggested route from the searcher device to the general location. Thus, the general location to the searcher device may enable a user of the searcher device to move toward the general location of the target device. When the searcher device receives the general location, and is already located in the general location, the searcher device may notify the user that the user is in the general location.

Process 300 may include collecting sensor information from devices in the general location (block 340). For instance, location server 230 may cause the searcher device and/or the target device to collect information corresponding to one or more types of sensors (also referred to herein as sensor information). Examples of the types of sensors may include a proximity sensor, light sensor, barometric pressure sensor, magnetometer, accelerometer, gyroscope, and temperature sensor (e.g., a battery thermometer, ambient temperature sensor, etc.), etc. Sensor information, as described herein, may include a sensor reading from a particular sensor of a particular user device 210. In some embodiments, sensor information may include information associated with a sensor reading, such as a sensor type, user device ID, and timing (e.g., a timestamp), etc. The sensor information collected by the searcher device and the target device may be provided to location server 230.

In some embodiments, location serve 230 may cause other devices in the general location to collect one or more types of sensor information and/or provide the sensor information to location server 230. For example, location server 230 may identify other user devices 210 located in or near the general location, determine the types of sensor information that the other user devices 210 can collect, and/or cause the other user devices 210 to collect one or more types of sensor information. In some embodiments, location server 230 may limit the sensor information collected by one or more user devices 210 to, for example, reduce network congestions that might otherwise be caused by the user devices 210 collecting and forwarding types of sensor information that are unnecessary or of little use to locating the target device.

Process 300 may also include determining sensor patterns based on sensor information (block 350). For instance, location device 230 may process sensor information to determine one or more patterns described by the sensor information. A sensor pattern, as described herein, may include multiple sensor readings that are mapped to one or more variables, such as time, distance, device, etc. While a sensor reading may provide a snapshot of an environmental condition (e.g., temperature, luminescence, etc.) at a particular user device 210, a sensor pattern may provide a more complete picture of the environment of the user device 210 (e.g., whether the user device is indoors or outdoors, in an enclosure or an open environment, etc.).

Figure 5:
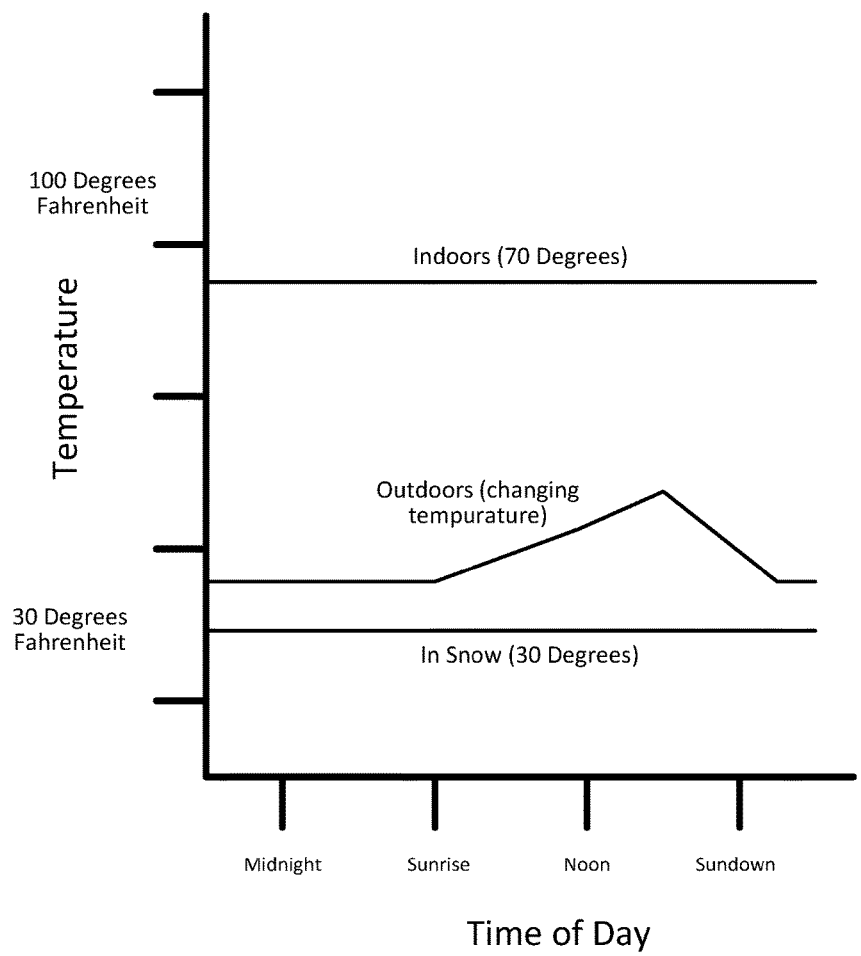
FIG. 5 is a diagram of an example sensor pattern of temperature readings.

FIG. 5 is a diagram of an example sensor pattern of temperature readings. As shown, when user device 210 is located in a climate controlled environment (e.g., indoors), a temperature pattern for the user device may be relatively stable (e.g., 70 degrees) throughout a twenty-four-hour period. When user device 210 is located outside, the temperature pattern for the device may change based on the time of day, with the temperature increasing with the sunrise and decreasing with the sunset. However, the temperature pattern of user device 210 located outside may not always vary in accordance with the location of the sun. For example, if user device 210 is located in the snow, the temperature pattern of user device 210 may be modified by the presence of snow such that the temperature remains constant regardless of the time of day. Thus, location server 230 may map sensor readings into a sensor pattern to get a more complete picture of the environment in which a particular user device 210 (e.g., the target device) is located.

Figure 6:
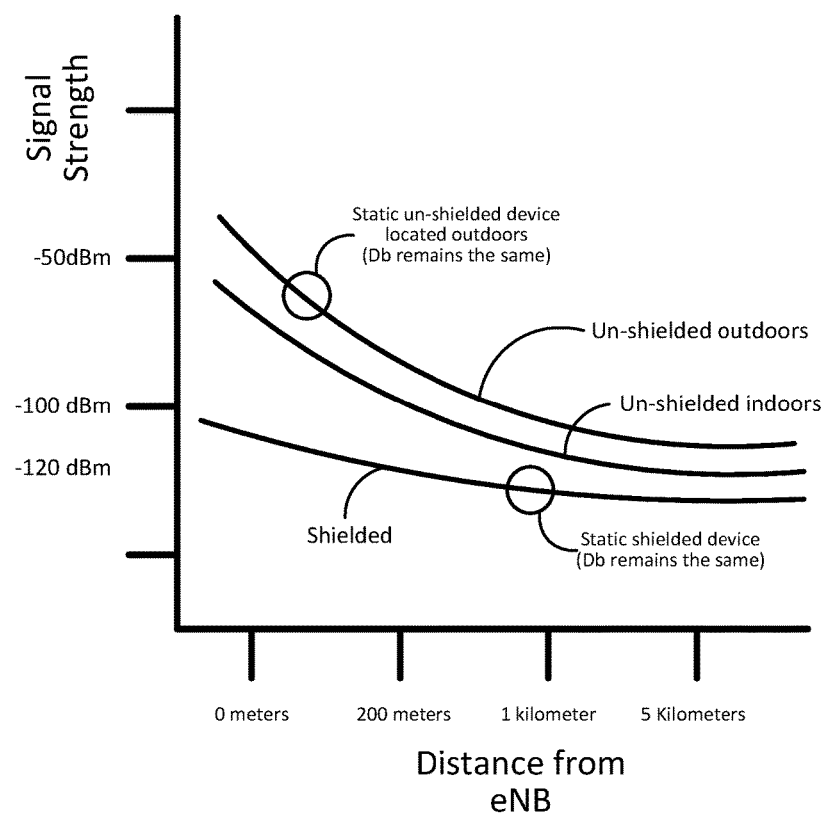
FIG. 6 is a diagram of an example sensor pattern of Radio Frequency (RF) signal strength readings.

FIG. 6 is a diagram of an example sensor pattern of RF signal strength readings. As shown, when user device 210 is located near a wireless access point (e.g., eNB 220), a signal strength for user device 210 may be relatively strong. By contrast, when user device 210 is located away from eNB 220, the signal strength may decrease. Thus, signal strength may be an indicator of how far away a target device is from an eNB 220. Additionally, when mapped over time, a change in signal strength may indicate that user device 210 is moving closer to, or further away from, eNB 220.

As shown, signal strength may sometimes be modified by more than just distance. For instance, when the signal between user device 210 and eNB 220 is blocked, shielded, or otherwise obstructed, the signal strength may be lower than would otherwise be the case. For instance, if user device 210 is inside a metal dumpster, behind a wall, etc., the signal strength may be lower than expected since the obstruction may diminish the signal strength. Thus, a signal strength reading and corresponding distance (between the user device 210 and eNB 220) may be compared to a known signal strength at the same distance to help determine whether the signal strength is being diminished by a structure or object, which may help determine whether the user device 210 is indoors, outdoors, inside or behind an object, etc.

Below is a table (TABLE 1) of example sensor patterns that include temperature patterns (TP1-TP5), radio frequency (RF) signal patterns (RFP1-RFP5), luminescence patterns (LP1-LP5), pressure patterns (PP1-PP5), and ambient sound patterns (SP1-SP5).

TABLE 1

| Temperature Pattern | RF Signal Pattern | Luminescence Pattern | Pressure Pattern | Ambient Sound Pattern |
|---|---|---|---|---|
| TP1 (Indoors - Consistent, room temperature) | RFP1 (Blocked - low signal strength but near eNB) | LP1 (In Office - consistently bright) | PP1 (On a particular floor of a building - consistent according to elevation change) | SP1 (Near a loud sound source - loud high pitch) |
| TP2 (Outdoors - changes according to daytime) | RFP2 (Far from AP - low signal strength consistent) | LP2 (Outdoors - bright during day hours, changes according to sunrise and sunset) | PP2 (Underground - consistent according to elevation change | SP2 (Near a car or motor - high pitch humming) |
| TP3 (Near heat source - consistently high) | RFP3 (Near AP - high signal strength consistent) | LP3 (In an Enclosure - consistently dark) | PP3 (At high altitude - consistently very low) | SP3 (In a crowd - high background noise in the audible range) |
| TP4 (Moving - changes according to being indoor and outdoor) | RFP4 (Moving - slow and/or periodic changes in signal strength) | LP4 (Passing streetlights or near an alarm - flashing) | PP4 (At low altitude - consistently very high) | SP4 (On a city street - high background white noise) |
| TP5 (Melting (or freezing) - consistently at or near a melting (or freezing) point) | RFP5 (Between APs - signal strength changing rapidly) | LP5 (Facing light source - consistently bright) | PP5 (Vertical velocity - smooth change) | SP5 (In an enclosed space - echo) |

Each example sensor pattern includes a description of the sensor pattern and a condition (of an environment of a device) that may correspond to the sensor pattern. For example, TP1 includes a pattern of similar temperatures that are at or near room temperature, which may suggest an indoor location, climate controlled by heating or air conditioning. As another example, RFP1 includes a pattern of low signal strengths corresponding to a user device 210 near eNB 220, which may suggest that there is an object or structure blocking the signal between user device 210 and eNB 220. LP2 includes a pattern of luminescence that is bright during the day and dark at night, which may suggest that user device 210 is outdoors or near a window.

Returning to FIG. 3, process 300 may include determining a location of the target device based on the sensor patterns (block 360). For example, location server 230 may combine the sensor patterns corresponding to the target device to create a description of the environment in which the target device is located. For example, location server 230 may use an Observed Time Difference of Arrival technique to determine a distance between the target device and eNB 220; a signal strength to determine whether there is an obstruction (e.g., a wall, a building, etc.) between the target device and eNB 220, and a temperature pattern to determine whether the target device is indoors. Location server 230 may use a pressure pattern to determine whether the target device is located below ground (e.g., in a basement), at ground level, or above ground (e.g., on a particular floor of a high-rise building, on a hill, etc.). In some embodiments, the combination of sensor patterns may describe the local environment (and thus, a more precise location) of the target device within the general location.

FIG. 18 is a table of an example of a combination of sensor patterns that describes a possible location of a target device. As shown, the sensor patterns include TP2, RFP1, LP3, PP1, and SP4.

Temperature pattern TP2 may indicate that the target device is located outside. RF signal pattern RFP1 may indicate that there is an object blocking the RF signal between the target device and eNB 220. Luminescence pattern LP3 may indicate that the target device is likely within some type of enclosure. Pressure pattern PP1 may indicate that the target device is at or near ground level, and ambient sound pattern SP4 may suggest that the target device is located near a relatively noisy area, such as a busy city street. As such, based on a combination of these sensor patterns, location server 230 may determine that the target device may be in a trash can or dumpster near a busy city street of the general location.

Below is a table of sensor pattern combinations that may describe a potential location for a target device.

target device (block 370). For example, location server 230 may provide the searcher device with an audible and/or textual description of the location of the target device (e.g., indoors, in an enclosure, and close to people talking to one another). In some embodiments, location server 230 may also provide the sensor patterns to the searcher device in case the user of the searcher device additional insight (e.g., by being present at the general location) on how to interpret the sensor patterns and ascertain the location of the target device.

In some embodiments, the example process of FIG. 3 may be modified in one or more ways. For example, the searcher device and the target device (instead of location server 230) may collect sensor information, determine sensor patterns based on the sensor information, and combine the sensor patterns to determine an environment of the searcher device and an environment of the target device. Information describing the environments may then be communicated to location server 230 so that location server 230 may provide, based on a comparison of the environments, instructions about how the user of the searcher device may locate the target device.

In some embodiments, tokens (or another type of pre-defined data structure) may be used to reduce network traffic when locating a target device. A token may include a unique identifier that is associated with unique combination of sensor patterns. The searcher device and the target device may each collect sensor readings, define sensor patterns, match the sensor patterns to a particular token, and provide the token to location server 230. In response, location server 230 may match the two tokens to a set of pre-defined instructions that were created in advance and as a response

TABLE 2

| Possible Location of Target Device | Temperature Pattern | RF Signal Pattern | Luminescence Pattern | Pressure Pattern | Ambient Sound Pattern |
|---|---|---|---|---|---|
| A toilet in an office building | Consistent, at room temperature | Consistent but weak relative to distance from eNB | Bright during working hours, dark after working hours | Constant | Echoes |
| Indoors, near a heater, where people are socializing | Periodic changes between high and room temperature | Consistent | Consistent | Consistent | High background noise in the audible range) |
| A moving vehicle | Consistent, at room temperature | Slow changes in signal strength | Rapidly changing (passing streetlights) | Consistent (Windows rolled up) | High pitch humming (car engine) |

As shown in Table 2, a target device located in a bathroom of an office building may have a temperature pattern that is consistently at room temperature; an RF signal pattern that is consistent but weak relative to an estimated distance from eNB 220; a luminescence pattern that is bright during working hours and dark after working hours; a pressure pattern that is constant (since the target device isn't changing altitudes; and an ambient sound pattern that includes echoes). Table 2 also includes a combination of signal patterns of a target device that may be indoors, close to a heater source (e.g., a heating vent), and near a group of people socializing with one another, in addition to a combination of signal patterns of a target device that may be in a moving vehicle. Other combinations of sensor readings and/or sensor patterns may indicate that the specific location of the target device whether that include a metal container (such as a filing cabinet, a dumpster, etc.), buried underground, indoors, outdoors, etc.

Returning to FIG. 3, process 300 may also include providing, to the searcher device, instructions for locating the to scenarios involving the same combination of tokens received by location server 230.

Figure 7:
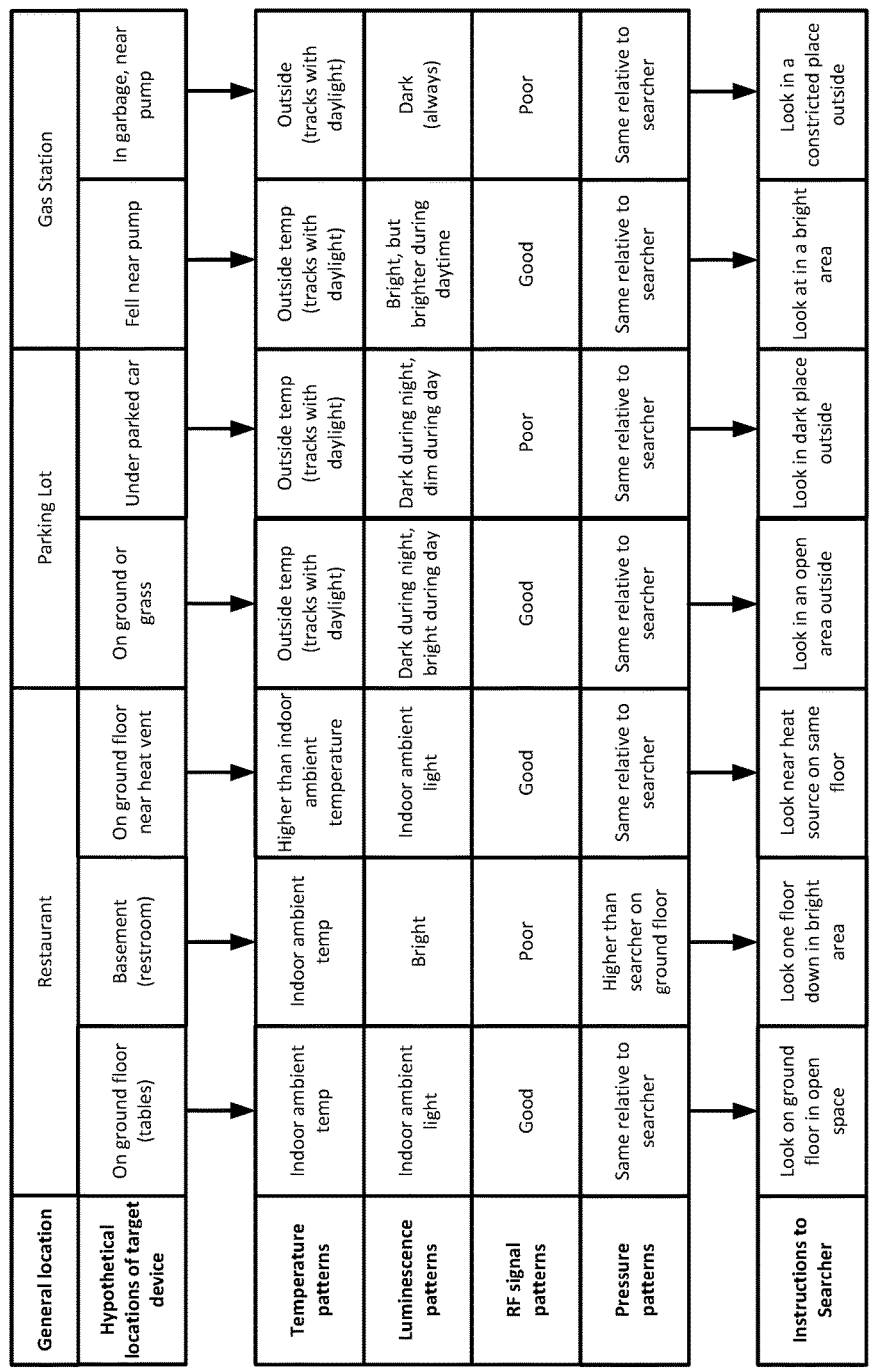
FIG. 7 is a diagram of examples of providing instructions for locating a target device based on one or more of the techniques described herein.

FIG. 7 is a diagram of examples of providing instructions for locating a target device based on one or more of the techniques described herein. FIG. 7 may be applicable to a scenario in which a user may have eaten at a restaurant, used a bathroom in a basement of the restaurant, stopped at a gas station while driving home, and not realizing that the user has lost his or her user device 210 until arriving at home. Therefore, the lost user device 210 (referred to below as a target device) may be located in one of many possible locations, including the restaurant, a parking lot of the restaurant, or the gas station.

Location server may combine the sensor patterns to describe the location of the target device, and based on the location, provide instructions, to the searcher device, about what the user should do to locate the target device. For example, if the general location is the restaurant, and the combination of sensor patterns indicate that the target device is likely in a basement of the restaurant, the instructions may include informing the user to go one floor down (from the ground floor) and look for the target device in a well-lit area. As another example, if the general location is the parking lot, and the combination of sensor patterns indicate that the target device is likely under a parked car, the instructions may include a message prompting the user to look for the target device outside in a dark or shaded location.

FIGS. 8-10 are diagrams of an example for learning traits associated with a general location. As shown in FIG. 8, a general location may include multiple user devices 210 (e.g., a searcher device, a target device, and one or more third-party devices). Location server 230 may cause the user device 210 located within (and/or near) the general location to collect sensor information and provide the sensor information to location server 230. Location server 230 may also receive time and location information corresponding to the sensor information. For purposes of explaining FIGS. 8-10, assume that the sensor information is temperature.

As shown in FIG. 9, location server 230 may map the sensor information to particular locations within the general location. In some embodiments, prior to mapping the sensor information to the general location, location server 230 may process the sensor information from different user devices 210 to determine whether the sensor information is reliable and to address any conflicting sensor information. For example, as user devices 210 move around the general location, two or more user devices 210 may collect a certain type of sensor information (e.g., temperature information) corresponding to the same time and location.

In such a scenario, location server may compare the sensor information from the user devices 210 to determine whether the sensor information is consistent with one another. For instance, when two user devices 210 in the same location provide similar temperature readings, location server 230 may determine that the temperature readings are accurate. By contrast, when the two temperature readings are very different from one another, location server 230 may address the conflict in one or more ways, such as flagging the temperature for that location as unknown, determining which temperature reading is correct by collecting sensor information for that location from other user device 210, analyzing previous temperature readings from each device to determine whether either has a history of inaccurate or questionable sensor readings, determining which reading is more consistent with a temperature gradient (based on the temperatures from other user devices in the general area) observed in the general location, etc.

Referring now to FIG. 10, location server 230 may interpret the sensor information, mapped to the general location, to better define the general location (i.e., to learn particular traits or features of a general location). For example, as shown in FIG. 9, location server 230 may determine that a general location includes a strong heat source, a weak heat source, and an element in the general location that is obstructing heat, from the strong heat source and the weak heat source, from defusing throughout the general location. Defining the general location in greater detail may enable location server 230 to provide, to a user of the search device, better instructions for locating the target device. For instance, in the example of FIGS. 8-10, location server 230 may inform the user of the searcher device that the target device is near a strong heat source (e.g., a heating vent, a portable heater, etc.) located in or near the general location.

Figure 11:
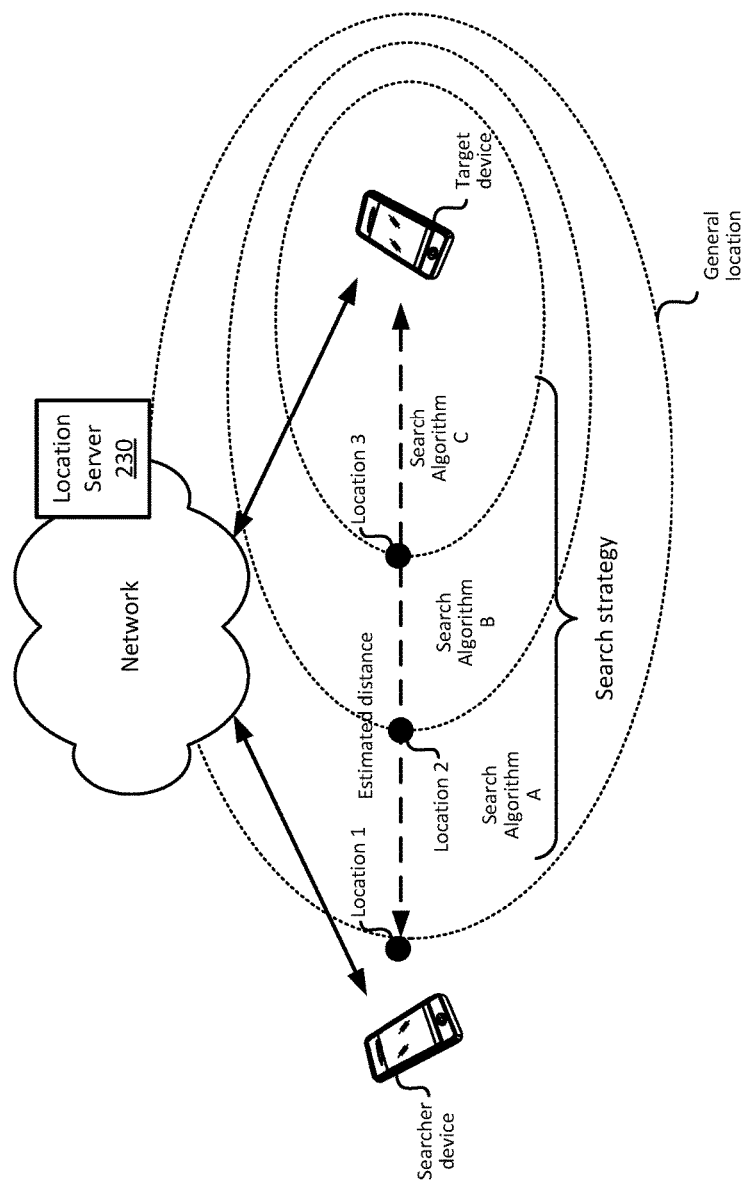
FIG. 11 is a diagram of an example search strategy for locating a target device.

FIG. 11 is a diagram of an example search strategy for locating a target device. A search strategy, as described herein, may include implementing one or more search algorithms. A search algorithm may include a technique for helping a user of the searcher device locate the target device. A search algorithm may be based on, or otherwise associated with, a particular type of sensor reading (or a particular group of sensor readings). Additionally, when a search algorithm is based on multiple sensor readings, the sensor readings may be weighted differently. For example, two different search algorithms may use RF readings and ambient sound readings, but one search algorithm may assign greater importance to the RF readings while the other search algorithm may assign greater importance to the ambient sound readings.

Further, a search algorithm may be associated with a particular trigger, such as an estimated distance between searcher device and target device, one or more sensor readings of the searcher device and/or the target device, a geographic location corresponding to the general location, an expiration of a pre-selected duration (e.g., an amount of time allotted to using the algorithm to find the target phone), etc. When the search strategy includes multiple search algorithms, one or more of the search algorithms may be performed concurrently. A search algorithm may be performed by one or more of the target device, the searcher device, and location server 230.

Additionally, a search strategy, and/or the search algorithms of the search strategy, may be determined dynamically. For example, the types of search algorithms and/or the characteristics of the search algorithms that are part of the search strategy may be modified based on one or more factors. An example of such a factor may include the capabilities of the searcher device, the target device, and/or other user devices 210 in the general location (e.g., the types of sensors on each device, whether the searcher device and the target device are capable of communicating directly with one another (referred to herein as "point-to-point communication"), etc.). For example, if the target device does not include a pressure sensor, the search algorithm may not include the collection of pressure information from the searcher device, the target device, or other devices 210 in the general location. Doing so may, for example, help conserve battery power of the searcher device, in addition to reducing network traffic.

Another factor that may be used to dynamically determine the search strategy may include the geographic area associated with the general location. For example, if the general location includes a busy city street during rush hour traffic, a search algorithm for the search strategy may be created or modified to not assign as much weight to ambient sound since traffic noise may be ubiquitous throughout the general location, and therefore not as useful in navigating the searcher device to the target device. Other factors that may be used to dynamically determine the search strategy may include features of the general location and/or whether certain types of sensor information are particularly descriptive of the general location. For example, if sensor patterns indicate that a general location (such as the general location discussed above with reference to FIGS. 8-10) has a decipherable temperature gradient and distinct features, such a strong heat source, a weak heat source, and a heat obstruction, a search algorithm may include (and/or) assign greater weight to temperature sensor information.

For example, when location server 230 receives a request, from the searcher device, to help locate the target device, location server 230 may determine the general location of the target device and may inform the searcher device of the general location. Additionally, location server 230 may determine the types of sensor information that the searcher device is able to collect. While the searcher device is traveling to the general location, location server 230 may receive a wide variety of sensor information from the target device and other user devices 210 located in (and/or near) the general location. Location server 230 may process and analyze the sensor information to, for example, determine the sensor collection capabilities of devices in the general location, identify features within the general location, determine whether certain types of sensor information would be more useful (or less useful) in helping the searcher device navigate toward the target device.

Based on the analysis, location server 230 may dynamically determine a search strategy for locating the target device. As shown in FIG. 11, the search strategy may include three search algorithms (A, B, and C) that each correspond to a distant range of estimated distances between the searcher device and the target device. In some embodiments, location server 230 may determine all of the search algorithms for the general location at the same time (or before the first algorithm (search algorithm A) is implemented). In other embodiments, location server 230 may determine one search algorithm (i.e., the search algorithm to be implemented when the searcher device arrives at the general location) and determine the other search algorithms (search algorithms B and C) as needed (e.g., if/when it becomes clear that the search algorithm is unable to provide adequate instructions for locating the target device).

When the searcher device arrives at (or comes within a threshold range) of the general location (Location 1), location server 230 may implement search algorithm A. For purposes of explaining FIG. 11, assume that search algorithm A is based on sensor patterns for temperature, RF signals, and pressure. Implementing search algorithm A may include location server 230 receiving temperature, RF signal, and pressure information from the searcher device and the target device, determining a sensor pattern for each type of sensor information, comparing the signal patterns for the searcher device to the signal patterns of the target device, and providing, to the searcher device, audible and/or textual instructions that are derived from the similarities and differences between the signal patterns. For example, if the sensor information (temperature, RF signal, and pressure) of the target device are consistent with the target device being in a basement, and the sensor information of the searcher device are consistent with the searcher device being on the ground floor of a building, location server 230 may provide instructions to the user of the searcher device to proceed to a basement of the building.

Assume that the user of the searcher device proceeds to the basement, such that the sensor readings of the searcher device and the target device are the same, but the user of the searcher device is still unable to locate the target device. As such, search algorithm B may be implemented to provide additional assistance to the user of the searcher device. For the purposes of explaining FIG. 11, assume that search algorithm B includes the searcher device receiving, from the location server 230, luminescence and ambient sound readings of the target device, comparing the readings to luminescence and ambient sound readings collected by the searcher device, and determining the similarities and differences between the two sets of readings. (In some embodiments, one or more of the operations of search algorithm B may be performed by location server 230 instead of searcher device.) Additionally, as the user of the searcher devices moves from one location to another, the searcher device may continue to collect and compare luminescence and ambient sound readings. Based on changes in the similarities and differences between the sensor information, the searcher device may indicate to the user of the searcher device, whether the user is getting closer to or further away from the target device. For example, if the searcher device is located in a room, where the lights are on and a group of people are socializing but the target device is located in a small dark closet away from the group of people, the searcher device may prompt the user of the searcher device to move away from the group of people socializing, in addition to indicating to the user that the target device is in a dark environment.

Assume that the user of the searcher device moves to a location away from the group of people, such that the ambient sound readings of the searcher device match the ambient sound readings of the target device (which may suggest that the two devices are in relatively close proximity of one another (Location 3)). Even though the luminescence readings of the searcher device and the target device may be different, the similarity in ambient sound readings may cause the searcher device to implement search algorithm C, which may include the searcher device attempting to establish point-to-point communication with the target device. Point-to-point communication, as described herein, may include the searcher device communicating with the target device in a manner that causes the target device to emit an audible sound (or another type of signal) that may disclose the precise location of the target device. This may include the searcher device calling (or otherwise contacting) the target device via the telecommunication network, a WiFi network, etc.), using a D2D protocol to communicate with the target device directly, transmitting a beacon signal that the target device may receive, recognize, and respond to by, for example, emitting a sound, illuminating, vibrating, etc.

FIG. 12 is a diagram of an example of types of search algorithms. As shown, a search algorithm may be an environment matching algorithm, a gradient matching algorithm, or an echo matching algorithm. The search algorithms may be performed, in whole or in part, by one or more device, such as location server 230, a searcher device, and/or a target device. The types of search algorithms of FIG. 12 are provided as examples only, and the techniques described herein may include search algorithms that are different, wholly or in part, from those of FIG. 12.

An environment matching algorithm may include a search technique directed to comparing a current environment of a searcher device to the current environment of the target device. Sensor information that may be useful for defining the environment of the searcher device and the target device may include temperature, pressure, and/or ambient sound. In some embodiments, an environment matching algorithm may include collecting sensor information (e.g., temperature, pressure, and ambient sound information) from the searcher device and the target device and determining a sensor pattern for each type of sensor information received. The environment matching algorithm may also include combining the sensors patterns of the searcher device to determine an environment of the searcher device and combining the sensors patterns of the target device to determine an environment of the target device. The environment matching algorithm may also compare the environment of the searcher device to the environment of the target device to determine similarities and differences between the two environments, and providing, to a user of the searcher device, a description of the similarities and/or differences. Additionally, or alternatively, instructions (audio, textual, etc.) may be providing a description of the environment of the target device to that the user of the searcher device may move to a location with an environment similar to the environment of the target device.

A gradient matching algorithm may include a search technique that provides a user of the searcher device with real-time or near real-time indications of whether the user is getting closer or further away from a target device. Sensor information that may be useful for a gradient matching algorithm may include RF signal information, luminescence information, ambient sound information, and/or temperature. A gradient matching algorithm may include periodically collecting a type of sensor reading (e.g., RF signal strength, luminescence, sound, temperature, etc.) from the target device and a sensor reading (of the same type) from the searcher device. The sensor readings may be compared to determine a difference (if any) between the two sensor readings. As the user moves (e.g., in search of the target device), a second sensor reading of the target device and/or searcher device may be collected and compared to one another. The difference between the first sensor readings and the difference between the second sensor readings may then be compared to determine whether the sensor device is closer or further from the target device, the results of which may be provided to a user of the search device. Thus, a gradient matching algorithm may constantly inform the user of the searcher device whether the user is getting closer or further away from the target device.

An echo matching algorithm may include a search technique that may enable the target device to directly communicate location information to the searcher device. In some embodiments, the searcher device may periodically transmit an audible sound or short-rage wireless signal that if/when received by the target device, may cause the target device to respond in a manner that enables the target device to be located. For example, the target device may transmit an audible that may be heard by the user of the searcher device. Additionally, or alternatively, the target device may begin transmitting a wireless signal that the searcher device may use to help the user to locate the target device. For instance, the searcher device may monitor changes in a signal strength and/or signal distance (e.g., signal transmission and response time) as the user moves from one location to another, and inform the user of the searcher device whether the user is getting closer or further away from the target device. As such, an echo matching algorithm may help the user of the search device to locate the target device by causing the target device to operate as a beacon.

In some embodiments, a search strategy may include an environment matching algorithm, a gradient matching algorithm, and an echo matching algorithm. For example, an environment matching algorithm may be used to provide the user with direction for locating the general environment (e.g., indoors, outdoors, below ground, above ground, in a quiet or noisy environment, etc.) where the target device is located. Once the searcher device is located in the same environment as the target device, a gradient matching algorithm may be used to provide more precise and frequent input regarding the location of the target device (e.g., whether the searcher device is moving closer or further from the target device). Once the searcher device is estimated to be at or near a threshold distance from the target device, an echo matching algorithm may be implemented to cause the target device to begin operating as a location beacon to provide even more (and/or more precise) input regarding the location of the target device. The threshold distance for triggering the echo matching algorithm may be based on a transmission distance of a short-range wireless signal used, by the searcher device, to communicate directly with the target device.

Figure 13:
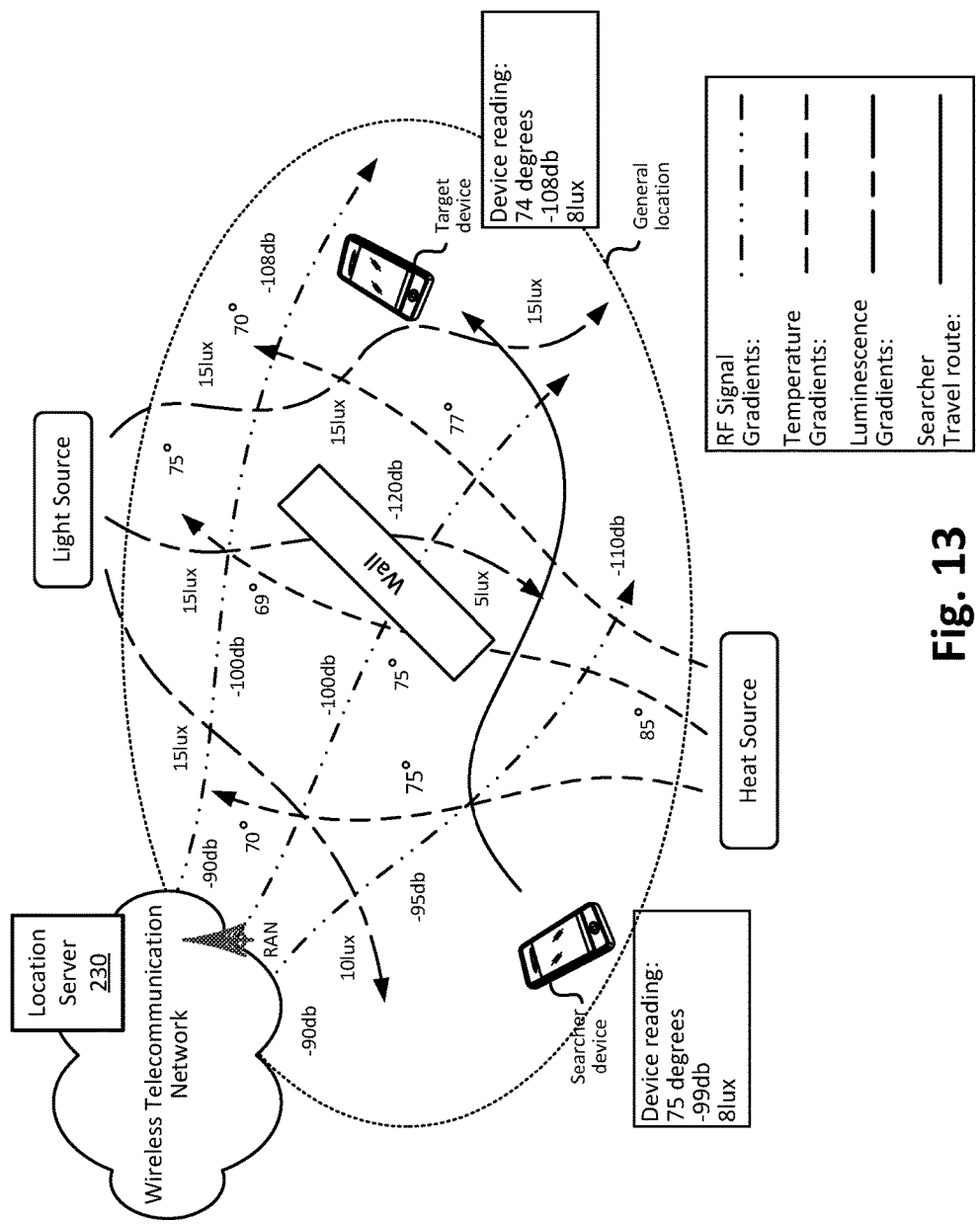
FIGS. 13-16 are diagrams of an example for using distinct types of sensor information to locate a target device.

FIGS. 13-16 are diagrams of an example for using distinct types of sensor information to locate a target device. FIG. 13 may include a relatively detailed example of a general location, while FIGS. 14-16 may each include simplified versions of the general location.

Referring to FIG. 13, a general location may include a searcher device, a target device, and one or more objects, such as a wall. The searcher device and the target device may each be connected to a wireless telecommunication network that includes a RAN and location server 230. The RAN may transmit wireless signals throughout the general location in accordance with a depicted RF signal gradients. Similarly, a nearby heat source may emanate heat across the general location in accordance with the depicted temperature gradients, and a nearby light source may radiate light throughout the general location in accordance with the depicted luminescence gradients. Also depicted in FIG. 13 is a route (a searcher traveler route) that a user of the searcher device may traverse to locate the target device. As described below with reference to FIGS. 14-16, the searcher device may implement a gradient matching algorithm to locate the target device.

Figure 14:
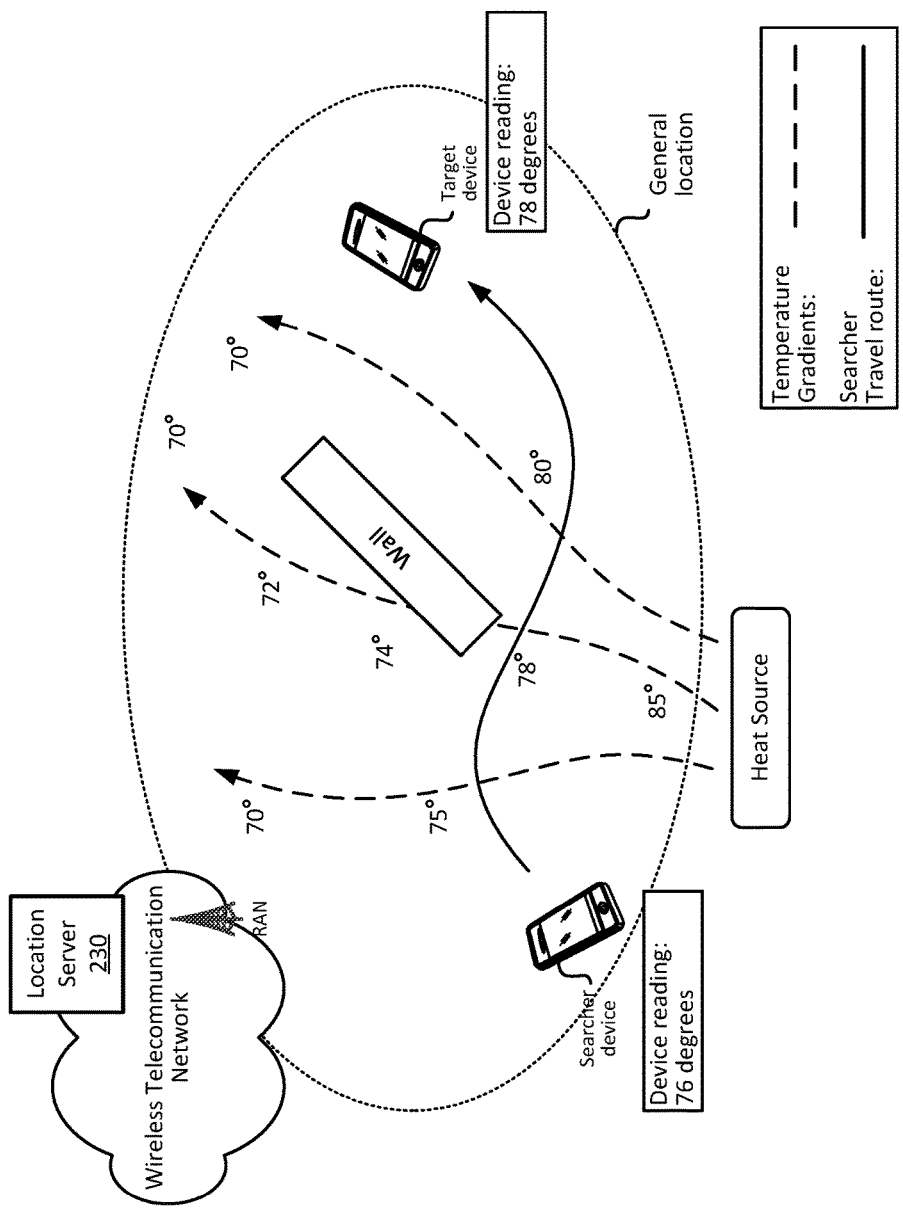
Figure 15:
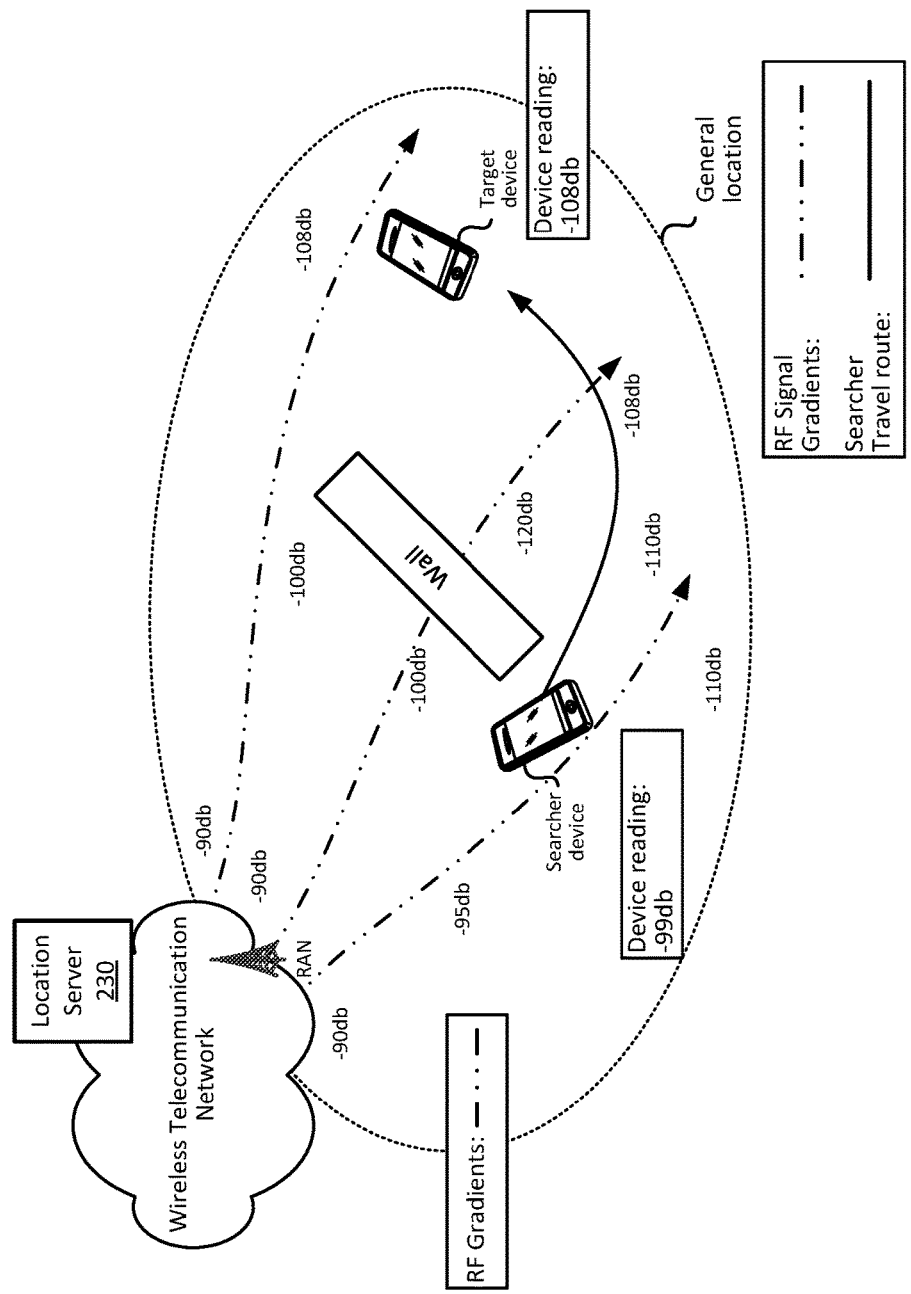

Referring to FIG. 14, the searcher device may send a request to location server 230 for location services regarding the target device. In response to the request, the location server may determine the general location of the target device and a search strategy for locating the target device. For purposes of explaining FIGS. 14-16, assume that the search strategy includes gradient matching algorithms for temperature, RF signal strength, and luminescence. As such, location server 230 may cause target device to obtain sensor readings for temperature, RF signal strength, and luminescence and provide the sensor reading to location server 230. Location server 230 may provide the sensor readings, of the target device, to the searcher device, along with information for implementing the search strategy (e.g., information identifying the gradient matching algorithms and the types of sensor information to use).

The searcher device may implement the search strategy by applying a gradient matching algorithm for temperature. As such, the searcher device may obtain a temperature reading of the searcher device, compare the temperature reading to the temperature reading of the target device, and indicate the results of the comparison to the user of the searcher device. In response, the user may begin moving further into the general location, while monitoring outputs from the gradient matching algorithm to determine whether the user is moving toward the target device. As shown, the initial temperature reading of the searcher device may be 76 degrees and the temperature reading of the target device may be 78 degrees. As such, as the user moves throughout the general location, the user may monitor outputs from the gradient matching algorithm to determine whether the user is moving toward a warmer position within the general location. As shown, the user may initially move toward a cooler portion (around 75 degrees) of the general location and the gradient matching algorithm may suggest that the user move in a different direction. In response, the user may begin heading in a different direction (to the right) to see if the temperature readings of the searcher device increase, which they do. When the temperature readings of the searcher device are equal to the temperature reading of the target device (78 degrees), the gradient matching algorithm may switch to (or begin including) a different type of sensor information, such as RF signal strength.

Referring to FIG. 14, the gradient matching algorithm may determine the difference between the RF signal strength of the target device (−108 db) and the RF signal strength of the searcher device (−99 db). Given the difference between the RF readings, the gradient matching algorithm may prompt the user to continue searching for the target device. Since the user already knows not to backtrack (because of output of the gradient matching algorithm regarding temperature), the user may continue moving in a forward direction, while monitoring outputs from the gradient matching algorithm regarding RF signal strength. Heeding the prompts from the gradient matching algorithm, the searcher device may pass between a location of −110 db and another location of −120 db until reaching a location of −108 db, which matches the RF signal strength of the target device. Additionally, while the temperature reading of the searcher device may have increased a bit (e.g., from 78 degrees to 80 degrees), the gradient matching algorithm may temporarily ignore this change in temperature since: 1) backtracking has been ruled out by previous outputs from the gradient matching algorithm; and 2) there is a reasonable likelihood that the temperature readings will return back to 78 degrees as the user follows the subsequent prompts, from the gradient matching algorithm, regarding luminescence.

Figure 16:
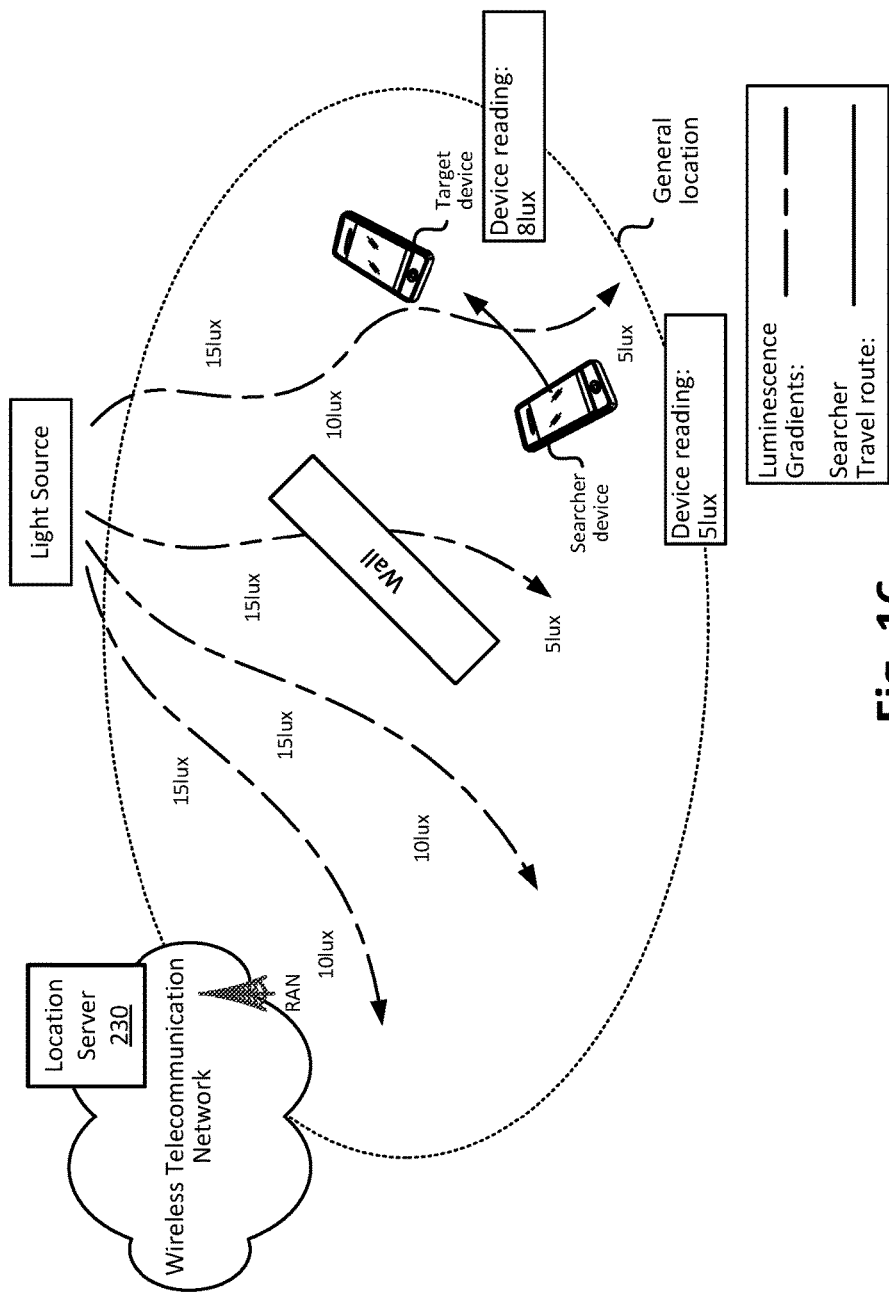

Referring to FIG. 16, the gradient matching algorithm may include comparing the luminescence reading of the target device (8 lux) to luminescence readings of the searcher device (5 lux). Since the readings are not the same, the gradient matching algorithm may prompt the user to continue moving throughout the general location, which the user may do in a similar direction as before. As the searcher device continues to take temperature measurements, the gradient matching algorithm may continue to compare the new measurements with the temperature reading of the target device to determine whether the user appears to be moving in a direction that will result in a luminesce reading that is equal to the luminescence reading of the target device. When the luminescence reading of the searcher device equals the luminescence of the target device, the gradient matching algorithm may verify whether the other sensor readings (temperature and RF signal strength) also match the readings form the target device. Upon confirming that the sensor readings of both devices match, the gradient matching algorithm may notify the user of the search device that the target device may be nearby.

In some embodiments, when the sensor readings of both device match, or when a difference between the sensor readings are within a pre-selected threshold, the searcher device may initiate another search algorithm to further help locate the device. For example, since the sensor readings being similar may suggest that the target device is very nearby, the searcher device may implement an echo matching algorithm to cause the target device to operate a location beacon by emitting a sound that the user may hear and/or transmitting a wireless signal that the searcher device may receive and use to locate the target device.

Additionally, or alternatively, when the gradient matching algorithm indicates that the target device should be very nearby, but the user is still unable to locate the target device, the searcher device may notify location server 230 of the situation. In response, location server 230 may determine another type of search algorithm to implement in order to provide additional help to locate the target device. For example, if the general location includes a building (e.g., a hotel), location server 230 initiate an environment matching algorithm (or another gradient matching algorithm) with respect to pressure and sound, which may (for example) help determine whether the target device is in a different room or floor of the building. As described herein, combinations of sensor readings and/or sensor patterns may indicate the specific location of the target device, such as whether the target device is in a metal container (such as a filing cabinet, a dumpster, etc.), buried underground, in a moving object (such as a vehicle), indoors, outdoors, etc.

FIG. 17 is a diagram of example components of a device 1700. Each of the devices illustrated in FIGS. 1, 2, 8, 11, and 13-17 may include one or more devices 1700. Device 1700 may include bus 1710, processor 1720, memory 1730, input component 1740, output component 1750, and communication interface 1760. In another embodiment, device 1700 may include additional, fewer, different, or differently arranged components. As described herein, a component may be implemented by hardware circuitry, software logic, and/or some combination thereof.

Bus 1710 may include one or more communication paths that permit communication among the components of device 1700. Processor 1720 may include a processor, microprocessor, or processing logic that may interpret and execute instructions. Memory 1730 may include any type of dynamic storage device that may store information and instructions for execution by processor 1720, and/or any type of non-volatile storage device that may store information for use by processor 1720.

Input component 1740 may include a mechanism that permits an operator to input information to device 1700, such as a keyboard, a keypad, a button, a switch, etc. Output component 1750 may include a mechanism that outputs information to the operator, such as a display, a speaker, one or more light emitting diodes (LEDs), etc.

Communication interface 1760 may include any transceiver-like mechanism that enables device 1700 to communicate with other devices and/or systems. For example, communication interface 1760 may include an Ethernet interface, an optical interface, a coaxial interface, or the like. Communication interface 1760 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1700 may include more than one communication interface 1760. For instance, device 1700 may include an optical interface and an Ethernet interface.

Device 1700 may perform certain operations described above. Device 1700 may perform these operations in response to processor 1720 executing software instructions stored in a computer-readable medium, such as memory 1730. A computer-readable medium may be defined as a non-transitory memory device. A memory device may include space within a single physical memory device or spread across multiple physical memory devices. The software instructions may be read into memory 1730 from another computer-readable medium or from another device. The software instructions stored in memory 1730 may cause processor 1720 to perform processes described herein. Alternatively, hardwired circuitry may be used in place of or in combination with software instructions to implement processes described herein. Thus, embodiments described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 1 and 3 the order of the blocks and arrangement of the lines and/or arrows may be modified in other embodiments. Further, non-dependent blocks may be performed in parallel. Similarly, while series of communications have been described with regard to several of the Figures provided herein, the order or nature of the communications may potentially be modified in other embodiments.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be collected in accordance with all applicable laws, will not be released unless authorized by law, and shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A server device, comprising:
    a non-transitory memory device storing a plurality of processor-executable instructions; and
    one or more processors configured to execute the processor-executable instructions, wherein executing the processor-executable instructions causes the one or more processors to:
        receive a request, associated with a first user device, to locate a second user device;
        determine a general location of the second user device, the general location including a geographic area where the second user device is located;
        provide, to the first user device, the general location of the second user device;
        receive sensor readings associated with a plurality of sensors of the second user device, the sensor readings include at least readings corresponding to temperature and ambient sound;
        identify patterns of the sensor readings of the plurality of sensors, wherein the identification of the patterns of the sensor readings include at least:
            identification of a first pattern based on a change in temperature, and
            identification of a second pattern based on a pitch of the ambient sound;
        determine a possible location of the second user device, within the general location, as a location corresponding to a combination of at least two of the identified patterns;
        generate instructions for locating the second user device within the general location, the instructions including a description of the determined possible location of the second user device; and
        provide, to the first user device, the instructions.

2. The server device of claim 1, wherein executing the processor-executable instructions causes the one or more processors to:
    receive sensor readings associated with a plurality of sensors of the first user device;
    determine, based on a combination of the sensor readings of the first user device, information defining a location of the first user device within the general location; and
    generate the instructions for locating the second user device based on a combination of:
        the information defining the location of the first user device within the general location, and
        the determined possible location of the second user device.

3. The server device of claim 1, wherein the sensor readings additionally include at least one sensor reading selected from the group including:
    a Radio Frequency (RF) signal strength, and
    a luminescence.

4. The server device of claim 1, wherein executing the processor-executable instructions causes the one or more processors to:
    provide, to the first user device, the sensor readings of the second user device; and cause the first user device to:
        collect sensor readings, from a plurality of sensors, of the first user device;
        execute a comparison of the sensor readings of the first user device to the sensor readings of the second user device; and
        provide, based on the comparison, additional instructions, to a user of the first user device, for locating the second user device.

5. The server device of claim 1, wherein executing the processor-executable instructions causes the one or more processors to:
receive sensor readings, from a plurality of sensors, of the first user device;
estimate a distance between the first user device and the second user device by comparing the sensor readings of the first user device to the sensor readings of the second user device;
determine whether the distance satisfies a distance threshold; and
cause the second user device to communicate a beacon signal, for locating the second user device, to the first user device.

6. The server device of claim 1, wherein the sensor readings additionally include readings corresponding to pressure, and wherein the identification of the patterns of the sensor readings include at least:
identification of a third pattern based on changes in pressure.

7. A method comprising:
receiving, by a server device, a request, associated with a first user device, to locate a second user device;
determining, by the server device, a general location of the second user device, the general location including a geographic area where the second user device is located;
providing, by the server device and to the first user device, the general location of the second user device;
receiving, by the server device, sensor readings associated with a plurality of sensors of the second user device, the sensor readings include at least readings corresponding to temperature and ambient sound;
identifying, by the server device, patterns of the sensor readings of the plurality of sensors, wherein the identification of the patterns of the sensor readings include at least:
identification of a first pattern based on a change in temperature, and
identification of a second pattern based on a pitch of the ambient sound;
determining, by the server device, a possible location of the second user device, within the general location as a location corresponding to a combination of at least two of the identified patterns;
generating, by the server device, instructions for locating the second user device within the general location, the instructions including a description of the determined possible location of the second user device; and
providing, by the server device and to the first user device, the instructions.

8. The method of claim 7, further comprising:
receiving sensor readings associated with a plurality of sensors of the first user device;
determining, based on a combination of the sensor readings of the first user device, information defining a location of the first user device within the general location; and
generating the instructions for locating the second user device based on a combination of:
the information defining the location of the first user device within the general location, and
the determined possible location of the second user device.

9. The method of claim 7, wherein the sensor readings additionally include a Radio Frequency (RF) signal strength and a luminescence.

10. The method of claim 7, further comprising:
providing, to the first user device, the sensor readings of the second user device; and
causing the first user device to:
collect sensor readings, from a plurality of sensors of the first user device;
execute a comparison of the sensor readings of the first user device to the sensor readings of the second user device; and
provide, based on the comparison, additional instructions, to a user of the first user device, for locating the second user device.

11. The method of claim 7, further comprising:
receiving sensor readings, from plurality of sensors, of the first user device;
estimating a distance between the first user device and the second user device by comparing the sensor readings of the first user device to the sensor readings of the second user device;
determining whether the distance satisfies a distance threshold; and
causing the second user device to communicate a beacon signal, for locating the second user device, to the first user device.

12. The method of claim 7, wherein the sensor readings additionally include readings corresponding to pressure, and wherein the identification of the patterns of the sensor readings include at least:
identification of a third pattern based on changes in pressure.

13. A non-transitory computer readable medium storing a plurality of processor-executable instructions, wherein executing the processor-executable instructions causes one or more processors to:
receive a request, associated with a first user device, to locate a second user device;
determine a general location of the second user device, the general location including a geographic area where the second user device is located;
provide, to the first user device, the general location of the second user device;
receive sensor readings associated with a plurality of sensors of the second user device, the sensor readings include at least readings corresponding to temperature and ambient sound;
identify patterns of the sensor readings of the plurality of sensors, wherein the identification of the patterns of the sensor readings include at least:
identification of a first pattern based on a change in temperature, and
identification of a second pattern based on a pitch of the ambient sound;
determine a possible location of the second user device, within the general location as a location corresponding to a combination of at least two of the identified patterns;
generate instructions for locating the second user device within the general location, the instructions including a description of the determined possible location of the second user device; and
provide, to the first user device, the instructions.

14. The non-transitory computer readable medium of claim 13, wherein the processor-executable instructions causes one or more processors to:
receive sensor readings, from a plurality of sensors, of the first user device;

estimate a distance between the first user device and the second user device by comparing the sensor readings of the first user device to the sensor readings of the second user device;

determine whether the distance satisfies a distance threshold; and cause the second user device to communicate a beacon signal, for locating the second user device, to the first user device.

15. The non-transitory computer readable medium of 13, wherein the sensor readings additionally include readings corresponding to pressure, and wherein the identification of the patterns of the sensor readings include at least:

identification of a third pattern based on changes in pressure.

* * * * *